(12) United States Patent
Lin

(10) Patent No.: US 8,845,467 B2
(45) Date of Patent: *Sep. 30, 2014

(54) MULTIPLE SPROCKET ASSEMBLY FOR BICYCLE

(76) Inventor: Chang Hui Lin, Changhua Hsien (TW)

(*) Notice: Subject to any disclaimer, the term of this patent is extended or adjusted under 35 U.S.C. 154(b) by 557 days.

This patent is subject to a terminal disclaimer.

(21) Appl. No.: 13/066,015

(22) Filed: Apr. 5, 2011

(65) Prior Publication Data

US 2012/0258826 A1 Oct. 11, 2012

(51) Int. Cl.
*B62M 9/12* (2006.01)
*B62M 9/1242* (2010.01)
*B62M 9/124* (2010.01)

(52) U.S. Cl.
CPC ............. *B62M 9/124* (2013.01); *B62M 9/1242* (2013.01)
USPC .................................. 474/80; 474/78; 474/82

(58) Field of Classification Search
CPC ...... B62M 9/124; B62M 9/134; B62M 9/122; B62M 9/125; B62M 9/136
USPC ................................................ 474/78, 80, 82
See application file for complete search history.

(56) References Cited

U.S. PATENT DOCUMENTS

| | | | | |
|---|---|---|---|---|
| 4,701,152 A * | 10/1987 | Dutil et al. | | 474/70 |
| 4,773,893 A | 9/1988 | Su et al. | | |
| 5,350,339 A | 9/1994 | Carmichael | | |
| 5,466,194 A | 11/1995 | Steinberg et al. | | |
| 5,494,307 A * | 2/1996 | Anderson | | 280/236 |
| 5,649,877 A * | 7/1997 | Patterson | | 474/80 |
| 5,669,840 A | 9/1997 | Liao | | |
| 5,688,200 A * | 11/1997 | White | | 474/80 |
| 5,738,603 A | 4/1998 | Schmidt et al. | | |
| 7,166,048 B2 * | 1/2007 | Shahana et al. | | 474/82 |
| 7,951,028 B2 * | 5/2011 | Wickliffe | | 474/80 |
| 8,500,581 B2 * | 8/2013 | Lin | | 474/80 |
| 2003/0220163 A1 * | 11/2003 | Yin | | 474/80 |
| 2006/0019782 A1 * | 1/2006 | Wickliffe | | 474/80 |
| 2009/0054183 A1 * | 2/2009 | Takachi et al. | | 474/80 |

* cited by examiner

*Primary Examiner* — William E Dondero
*Assistant Examiner* — Michael Riegelman
(74) *Attorney, Agent, or Firm* — Charles E. Baxley

(57) ABSTRACT

A multiple sprocket assembly includes a number of sprockets attached to a hub of a bicycle frame, and a rear chain transfer device having a sliding member slidably attached to a guiding device, and a carrier attached to the sliding member and movable relative to the sprockets for engaging with a chain and for carrying and moving the chain onto the teeth of the sprockets, the rear chain transfer device includes a support attached to the bicycle frame, and the guiding device is secured to the support, the guiding device includes one or more tracks or channels for slidably engaging with and for guiding the sliding member to move relative to the guiding device.

4 Claims, 5 Drawing Sheets

MULTIPLE SPROCKET ASSEMBLY FOR BICYCLE

BACKGROUND OF THE INVENTION

1. Field of the Invention

The present invention relates to a multiple sprocket assembly for a bicycle, and more particularly to a multiple sprocket assembly including an improved carrying or moving device for smoothly carrying or moving the chain over or onto the sprockets of the multiple sprocket assembly and for preventing the chain from being scraped or scrubbed with the sprockets.

2. Description of the Prior Art

Typical multiple sprocket assemblies comprise a hub attached or mounted or secured to a bicycle frame with a quick release mechanism, a number of sprockets attached or mounted or secured onto the hub with bearing members or a one-way clutch mechanism for engaging with the chain, and a front chain transfer device and a rear chain transfer device attached or mounted or secured onto the bicycle frame for carrying or moving the chain over or onto the sprockets of the multiple sprocket assembly.

For example, U.S. Pat. No. 4,773,893 to Su et al., U.S. Pat. No. 5,350,339 to Carmichael, U.S. Pat. No. 5,466,194 to Steinberg et al., U.S. Pat. No. 5,669,840 to Liao, and U.S. Pat. No. 5,738,603 to Schmidt et al. disclose several of the typical multiple sprocket assemblies each also comprising a number of sprockets attached or mounted or secured onto the hub with bearing members or a one-way clutch mechanism for engaging with the chain, and a front chain transfer device and a rear chain transfer device attached or mounted or secured onto the bicycle frame for carrying or moving the chain over or onto the sprockets of the multiple sprocket assembly.

However, normally, while shifting the gear or changing the speed, the chain should be moved or shifted between the sprockets and should be contacted and scraped or scrubbed with the sprockets for allowing the chain to be moved between the sprockets of different outer diameter, the chain may not be moved to directly engage with the teeth of the sprockets without scraping or scrubbing with the sprockets.

The present invention has arisen to mitigate and/or obviate the afore-described disadvantages of the conventional multiple sprocket assemblies.

SUMMARY OF THE INVENTION

The primary objective of the present invention is to provide a multiple sprocket assembly including an improved carrying or moving device for smoothly carrying or moving the chain over or onto the sprockets of the multiple sprocket assembly and for preventing the chain from being scraped or scrubbed with the sprockets.

In accordance with one aspect of the invention, there is provided a multiple sprocket assembly comprising a plurality of sprockets attached to a hub of a bicycle frame, the sprockets each including a plurality of teeth, and a rear chain transfer device attached to the bicycle frame and including a guiding device attached to the bicycle frame, a sliding member slidably attached to the guiding device, and a carrier attached or secured to the sliding member and movable relative to the sprockets for engaging with a chain and for carrying and moving the chain onto the teeth of the sprockets and for preventing the chain from being scraped or scrubbed with the sprockets.

The rear chain transfer device includes a support attached or secured to the bicycle frame, and the guiding device is attached or secured to the support. The guiding device includes at least one track formed therein for slidably receiving or engaging with the sliding member.

The sliding member includes at least one bearing member attached thereto and engaged with the track of the guiding device for allowing the sliding member to be smoothly moved along or relative to the guiding device. The guiding device includes an end cap attached to the guiding device for blocking the track of the guiding device.

The sliding member includes at least one arm extended therefrom, and the bearing member is attached or secured to the arm and engaged with the track of the guiding device. The guiding device includes a spring biasing member engaged with the bearing member for biasing the sliding member relative to the guiding device and for recovering the sliding member when the sliding member is released.

The guiding device includes a cable attached or secured to the guiding device and coupled to the sliding member for pulling or moving the sliding member relative to the guiding device and for moving the carrier relative to the sprockets. The guiding device includes a cover attached thereto, and a guide tube attached to the cover for threading or receiving or engaging with the cable and for guiding the cable to move the sliding member.

The guiding device includes a middle or intermediate channel formed therein for slidably engaging with the sliding member. The sliding member includes at least one bearing member attached thereto and engaged with the channel of the guiding device for further smoothly guiding the sliding member to move relative to the guiding device.

The sliding member includes a bar provided therein for attaching and mounting or supporting the bearing member. The sliding member includes a protrusion extended therefrom, the bar is attached or secured to the protrusion with one or more latches or fasteners.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
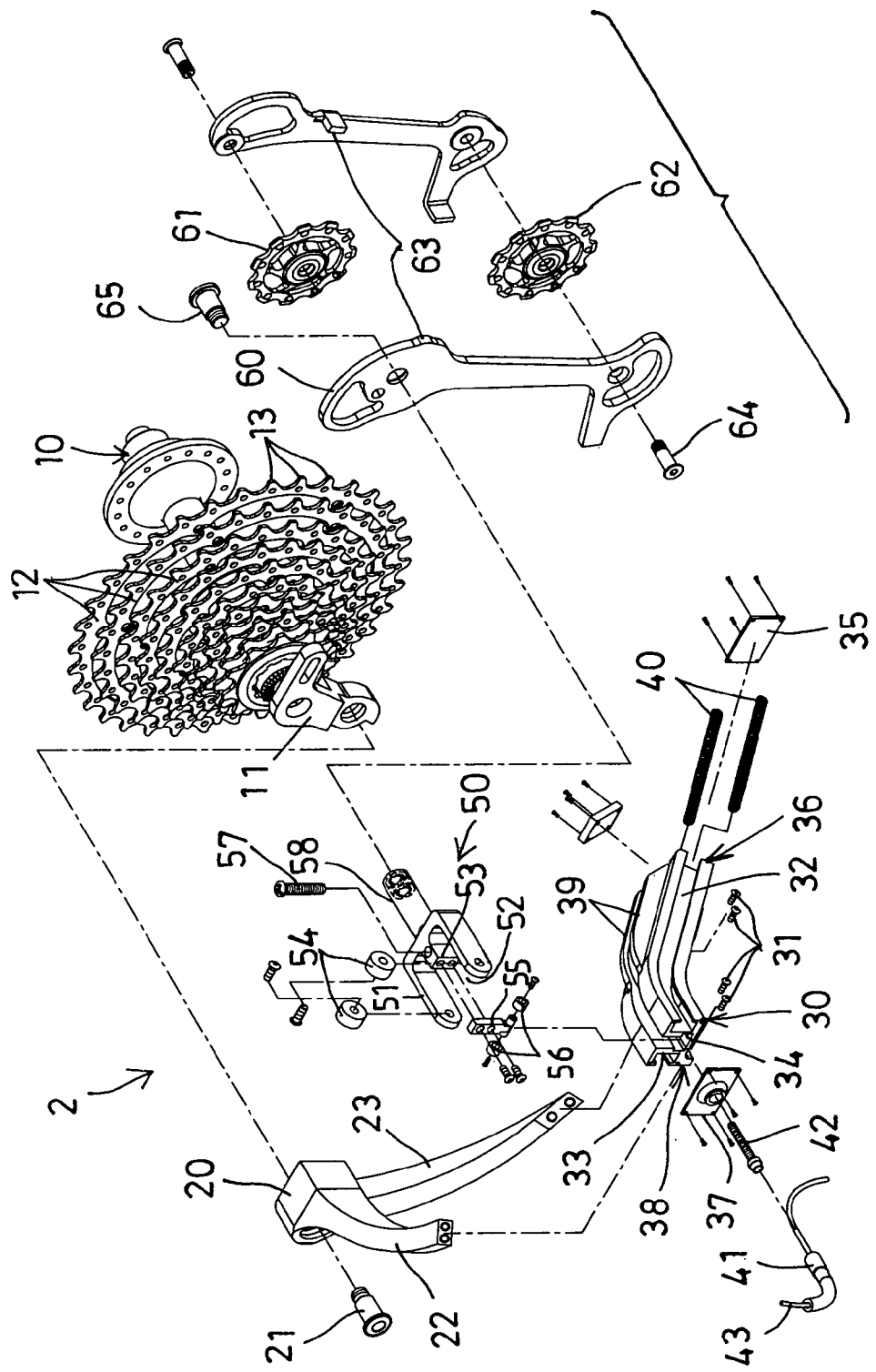
FIG. 1 is a partial exploded view of a multiple sprocket assembly in accordance with the present invention.
Figure 2:
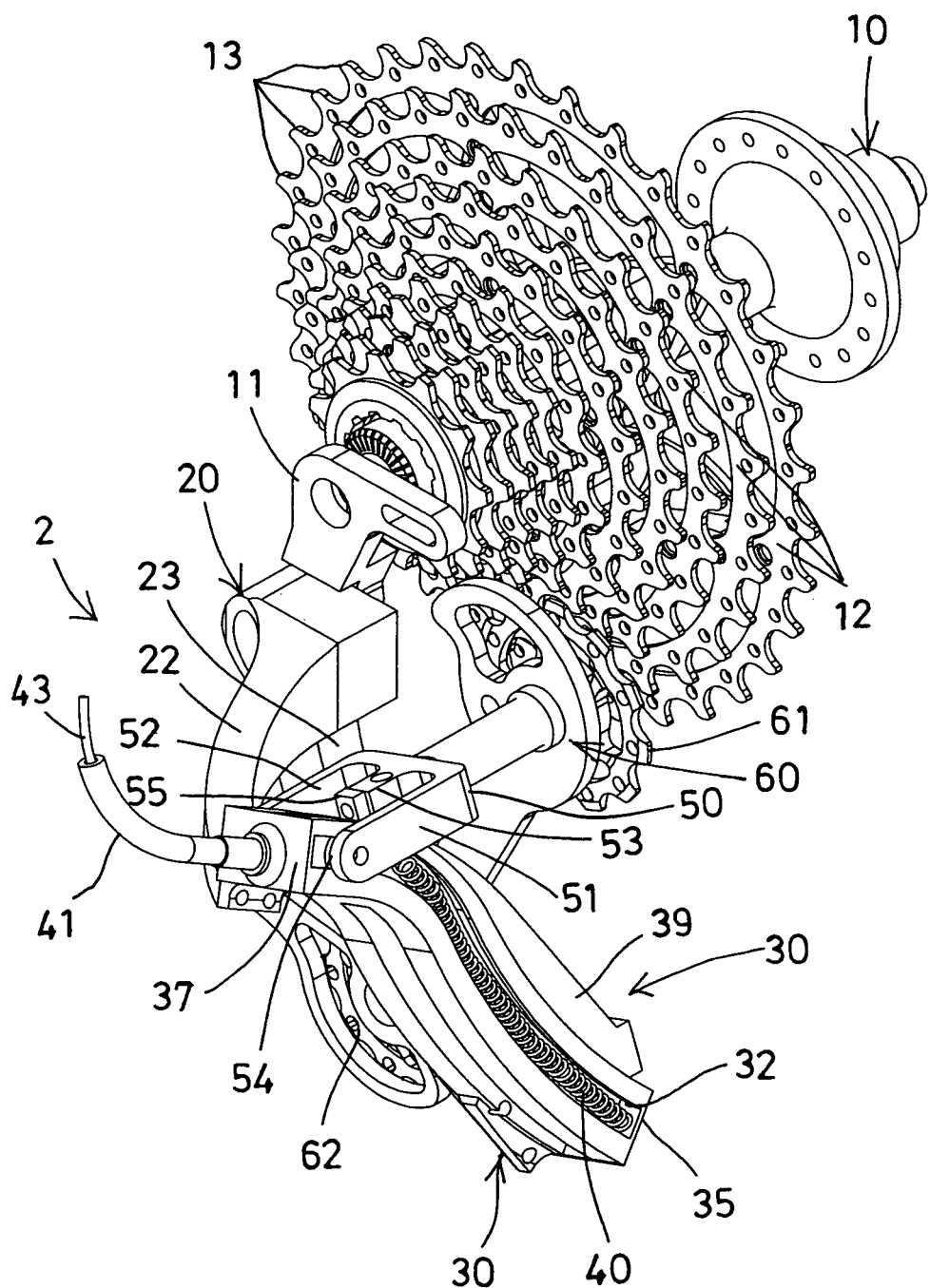
FIG. 2 is a partial rear perspective view of the multiple sprocket assembly.
Figure 3:
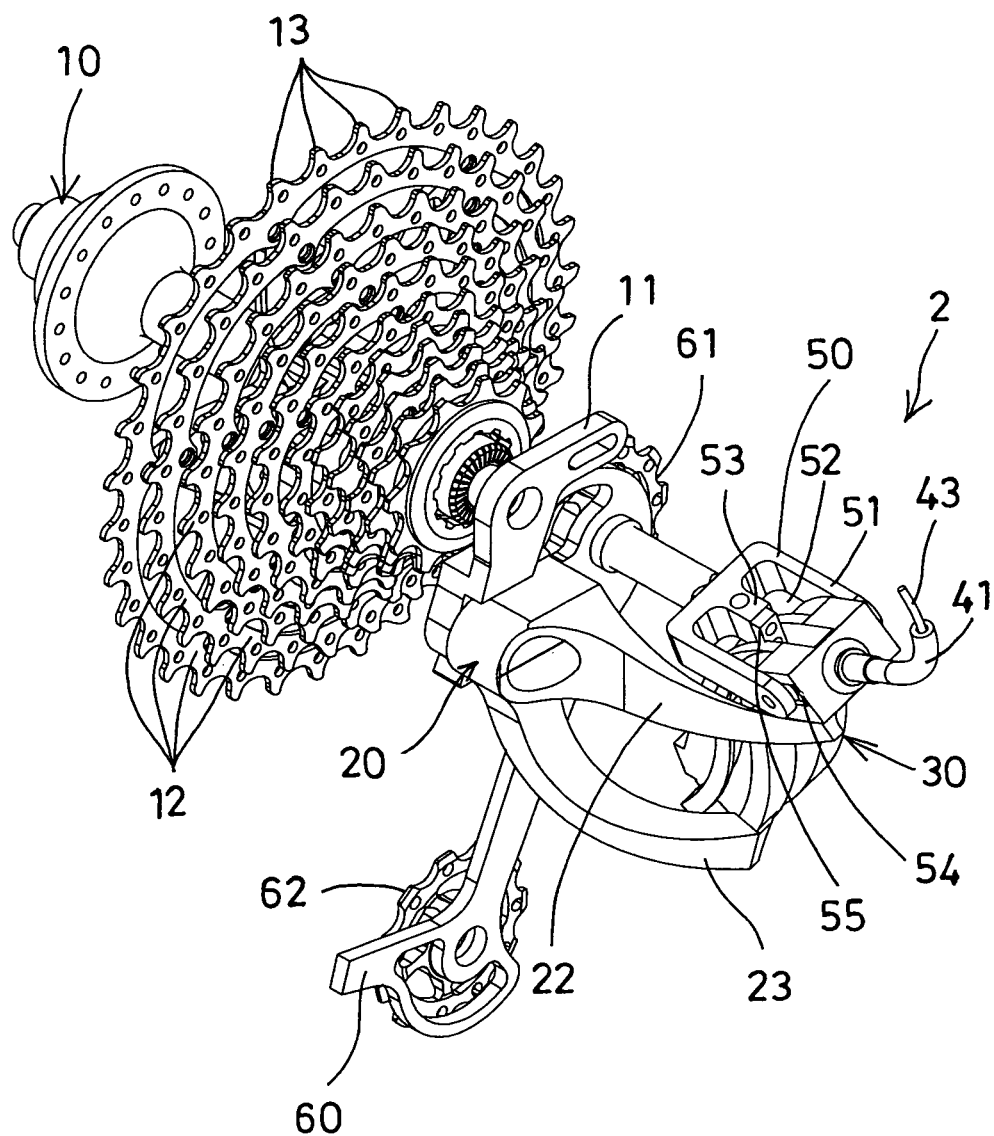
FIG. 3 is another partial perspective view of the multiple sprocket assembly as seen from the opposite direction to that shown in FIG. 2.

Referring to the drawings, and initially to FIGS. 1-3, a multiple sprocket assembly in accordance with the present invention comprises a hub 10 attached or mounted or secured to a bicycle frame 11 with a quick release mechanism (not shown) or the like, a number of sprockets 12 attached or mounted or secured onto the hub 10 with bearing members or a one-way clutch mechanism (not shown) for engaging with a chain (not shown), and a front chain transfer device (not shown) and a rear chain transfer device 2 attached or mounted or secured onto the bicycle frame 11 for carrying or moving the chain over or onto the number of teeth 13 of each of the sprockets 12, in which the hub 10 and the bicycle frame 11 and the sprockets 12 and the front chain transfer device are typical and are not related to the present invention and will not be described in further details.

Figure 4:
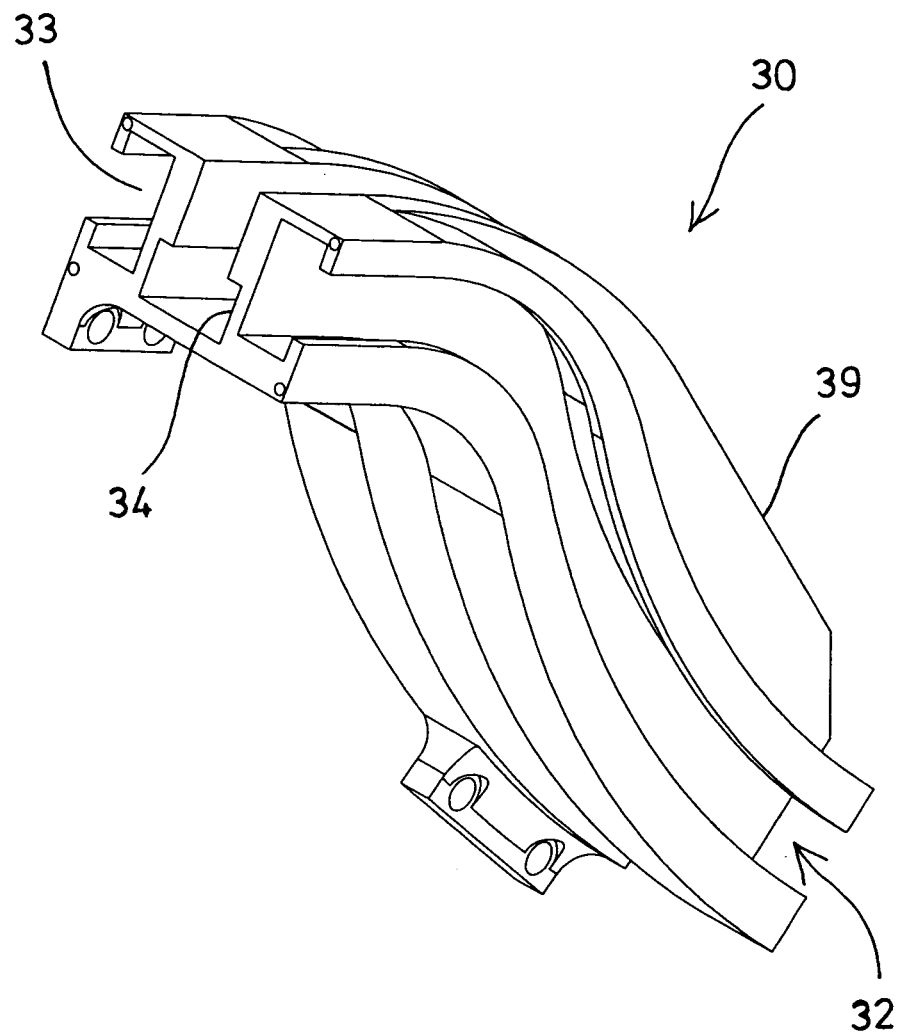
FIG. 4 is a perspective view illustrating a guide rail of the multiple sprocket assembly.
Figure 5:
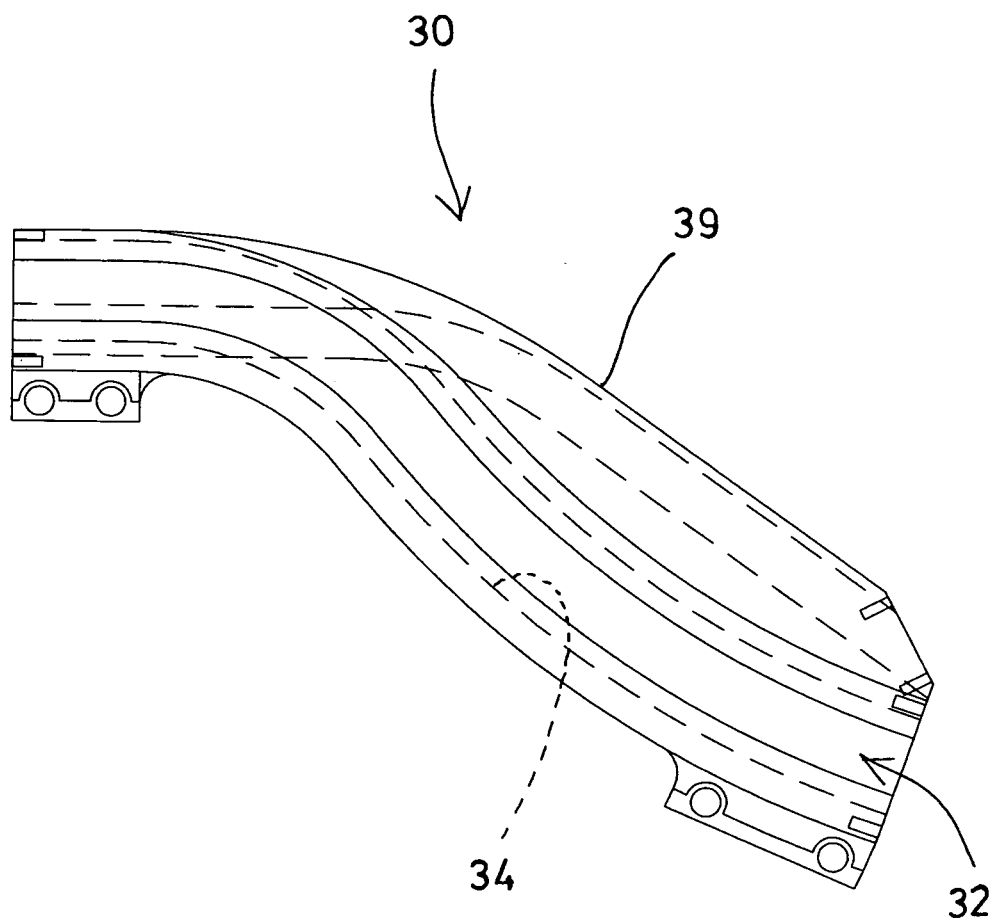
FIG. 5 is a side plan schematic view of the guide rail of the multiple sprocket assembly.

The rear chain transfer device 2 includes a rail or housing or support 20 attached or mounted or secured to the bicycle frame 11 with one or more latches or fasteners 21, and the housing or support 20 includes one or more (such as two) arms or extensions 22, 23 extended outwardly from the housing or support 20, the rear chain transfer device 2 further includes a guide rail or guiding device 30 attached or mounted or secured to the arms or extensions 22, 23 of the support 20 or directly attached or mounted or secured to the bicycle frame 11 with one or more latches or fasteners 31, or formed integral with the support 20, the guiding device 30 includes one or more (such as two) outer or side channels or rails or tracks 32, 33 formed therein and a middle or intermediate rail or track or groove or channel 34 formed therein and located between the side tracks 32, 33, as shown in FIGS. 1 and 4-5.

One or more (such as two) end caps 35 are attached or mounted or secured to one end 36 of the guiding device 30 for blocking or sealing or closing the side tracks 32, 33 at the one end 36 of the guiding device 30, and a cover 37 is attached or mounted or secured to the other end 38 of the guiding device 30 for blocking or sealing or closing the side tracks 32, 33 and the middle channel 34 at the other end 38 of the guiding device 30. The guiding device 30 includes a cam member or guiding bulge 39 formed or provided thereon, and a spring biasing member 40 disposed or received or engaged into the side tracks 32, 33 of the guiding device 30 respectively and located close to the end caps 35 of the guiding device 30.

A guide tube 41 is attached or mounted or secured to the cover 37 or to the other end 38 of the guiding device 30 with one or more latches or fasteners 42 for threading or receiving or engaging with a pulling cable 43 and for guiding the cable 43 to smoothly move or slide relative to the support 20 and the guiding device 30, in which the cable 43 is coupled to a typical shift lever (not shown) that may pull and move the cable 43 relative to the support 20 and the guiding device 30, in order to actuate or operate a sliding member 50 and a carrier 60 to move the chain and to suitably carry or move the chain over or onto the teeth 13 of the sprockets 12.

The sliding member 50 is slidably received or engaged or attached or mounted to the guiding device 30, and includes two limbs or arms 51 and a space 52 formed therein and formed or provided between the arms 51, and includes a protrusion 53 extended into the space 52 of the sliding member 50, and includes one or more rollers or wheels or pulleys or bearing members 54 attached or mounted or secured to each of the arms 51 of the sliding member 50 and slidably or movably received or engaged in the side tracks 32, 33 of the guiding device 30 respectively for smoothly guiding the sliding member 50 to move relative to or to move along the guiding device 30, and includes a bracket or bar 55 attached or mounted or secured to the protrusion 53.

The bracket or bar 55 is slidably or movably received or engaged in the middle channel 34 of the guiding device 30 for attaching or mounting or securing or supporting one or more rollers or wheels or pulleys or bearing members 56 which are also slidably or movably received or engaged in the middle channel 34 of the guiding device 30 for further smoothly guiding the sliding member 50 to move relative to or to move along the guiding device 30. The cable 43 is attached or mounted or secured to the sliding member 50 with one or more latches or fasteners 57 for allowing the sliding member 50 to be smoothly pulled and moved relative to or along the guiding device 30 with the cable 43. The sliding member 50 further includes a stud 58 for attaching or mounting or securing a cage assembly or chain carrier 60.

For example, the chain carrier 60 includes one or more (such as two) jockey wheels 61, 62 pivotally or rotatably attached or mounted or secured between two parallel frame plates 63 of the carrier 60 with latches or fasteners 64 for engaging with the chain and for suitably carrying or moving the chain over or onto the teeth 13 of the sprockets 12, and the carrier 60 is attached or mounted or secured to the stud 58 or the sliding member 50 with one or more latches or fasteners 65. For example, as shown in FIGS. 2-3, the carrier 60 may be moved relative to the sprockets 12 by the sliding movement of the sliding member 50 relative to the support 20 and the guiding device 30 for suitably carrying or moving the chain over or onto the teeth 13 of the sprockets 12. The sliding member 50 may be slidably or movably engaged with the cam member or guiding bulge 39 of the guiding device 30 which may be shaped or contoured to guide the carrier 60 to suitably carry or move the chain over or onto the teeth 13 of the sprockets 12.

The spring biasing members 40 are engaged with the bearing members 54 or the arms 51 of the sliding member 50 for biasing or forcing or moving or recovering the sliding member 50 relative to the support 20 and the guiding device 30 or toward the end caps 35 or the one end 36 of the guiding device 30. For example, the bearing members 54 or the arms 51 of the sliding member 50 may force or move onto or toward or against the spring biasing members 40 when the sliding member 50 and the carrier 60 are moved relative to the support 20 and the guiding device 30 and moved toward the cover 37 or the other end 38 of the guiding device 30 with the cable 43, and the spring biasing members 40 may force or bias or move or recover the sliding member 50 and the carrier 60 toward the end caps 35 or the one end 36 of the guiding device 30 when the cable 43 is released.

In operation, as shown in FIGS. 2 and 3, the carrier 60 may be moved relative to the sprockets 12, particularly moved in the direction parallel to an image plane (not shown) that is formed by the addendum of the teeth 13 of the sprockets 12, by the sliding movement of the sliding member 50 relative to the support 20 and the guiding device 30 and with the cable 43, in order to suitably carry and smoothly move the chain over or onto the teeth 13 of the sprockets 12, the spring biasing member 40 may recover the sliding member 50 and the carrier 60 when the cable 43 or the shift lever is released. It is to be noted that the typical multiple sprocket assemblies failed to disclose or teach a carrier 60 that is movable relative to the sprockets 12 for suitably carrying or moving the chain over or onto the teeth 13 of the sprockets 12.

Accordingly, the multiple sprocket assembly in accordance with the present invention includes an improved carrying or moving device for smoothly carrying or moving the chain over or onto the sprockets of the multiple sprocket assembly and for preventing the chain from being scraped or scrubbed with the sprockets.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A multiple sprocket assembly comprising:
   a plurality of sprockets attached to a hub of a bicycle frame, said sprockets each including a plurality of teeth, and a rear chain transfer device including:
  a support attached to the bicycle frame,
  a guiding device secured to said support, said guiding device including two side tracks formed therein, and including a channel formed therein and located between said side tracks,
  a sliding member slidably attached to said guiding device, said sliding member including two arms, and including a space formed therein and provided between said arms, and including two bearing members attached to said arms and slidably engaged with said tracks of said guiding device for guiding said sliding member to smoothly move relative to said guiding device, and including a protrusion extended into said space of said sliding member, and including a bar attached to said protrusion, and including at least one bearing member attached to said bar and engaged with said channel of said guiding device for guiding said sliding member to move relative to said guiding device, and
  a carrier attached to said sliding member and movable relative to said sprockets for engaging with a chain and for carrying and moving the chain onto said teeth of said sprockets, and
  said guiding device including a cable coupled to said sliding member for moving said sliding member relative to said guiding device.

2. The multiple sprocket assembly as claimed in claim 1, wherein said guiding device includes a spring biasing member engaged with said bearing members for biasing said sliding member relative to said guiding device.

3. The multiple sprocket assembly as claimed in claim 1, wherein said guiding device includes an end cap attached to said guiding device for blocking said tracks of said guiding device.

4. The multiple sprocket assembly as claimed in claim 1, wherein said guiding device includes a cover, and a guide tube attached to said cover for engaging with said cable.

* * * * *